E. A. HAWTHORNE.
BRACKET.
APPLICATION FILED FEB. 28, 1917.
1,401,402.
Patented Dec. 27, 1921.
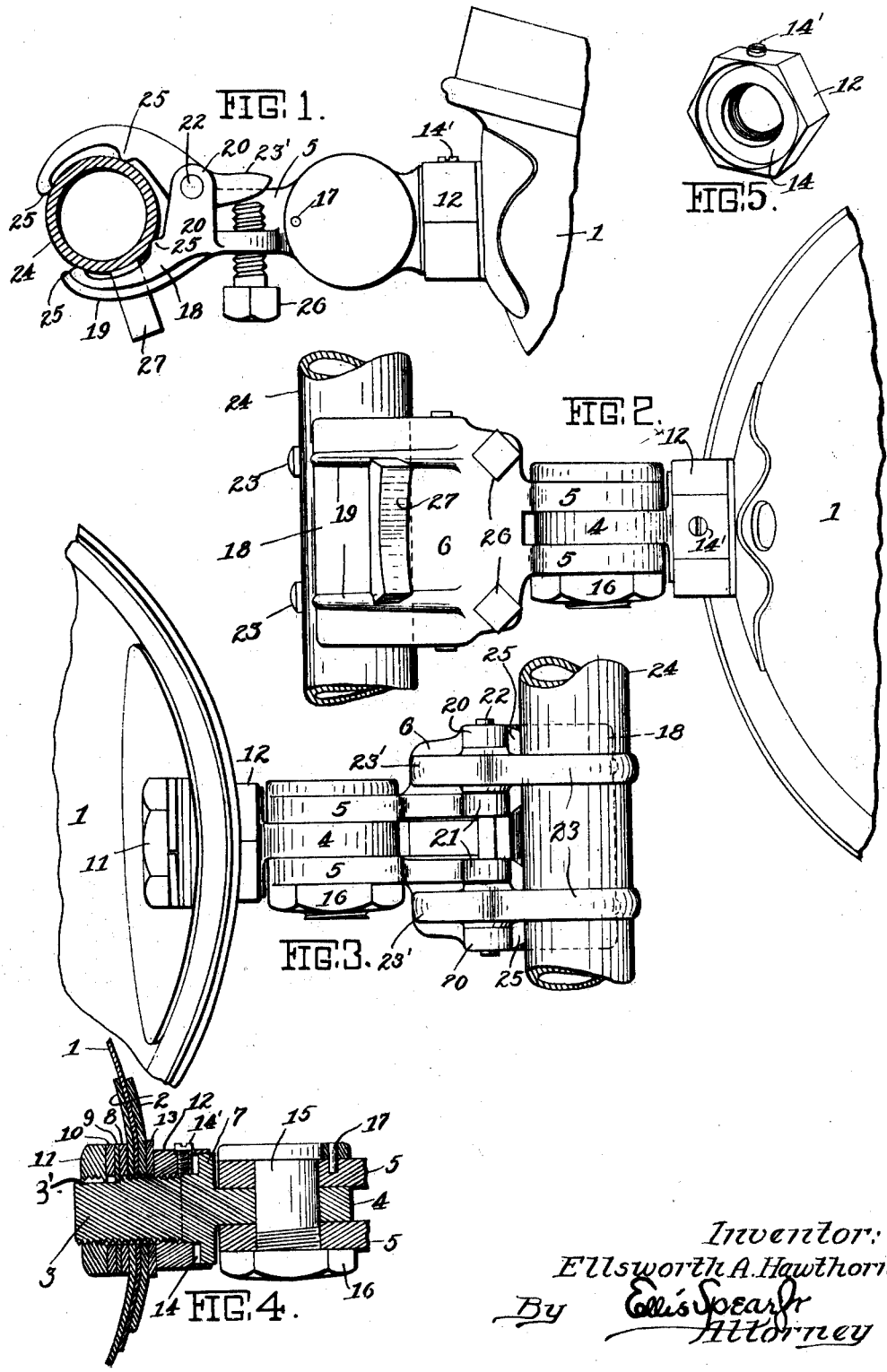
Inventor:
Ellsworth A. Hawthorne
By Ellis Spear Jr
Attorney

UNITED STATES PATENT OFFICE.

ELLSWORTH A. HAWTHORNE, OF BRIDGEPORT, CONNECTICUT.

BRACKET.

1,401,402.

Specification of Letters Patent.

Patented Dec. 27, 1921.

Application filed February 28, 1917. Serial No. 151,482.

*To all whom it may concern:*

Be it known that I, ELLSWORTH A. HAWTHORNE, a citizen of the United States, residing at Bridgeport, county of Fairfield, State of Connecticut, have invented certain new and useful Improvements in Brackets, of which the following is a specification.

This invention relates to brackets and particularly to an adjustable bracket for mounting a lamp of the spotlight type in universally adjustable relation upon the windshield of an automobile or the handle bar of a motor cycle, bicycle or other vehicle.

As usually constructed such brackets consist of a lamp carrying member extending into the lamp shell and swiveled thereto, and a clamp carrying member swiveled to the lamp carrying member. The attachment of the lamp to the lamp carrying member has been a source of expense in assembling the bracket on account of the necessary adjustment within the lamp shell, and of course any adjustment after the factory adjustment has been made requires that the lamp be taken apart in order to obtain access to the adjusting parts within the lamp shell. Moreover, it has been found in practice that the vibration, particularly when the lamp is used upon a motor cycle, is so severe that the lamp is gradually moved out of position, no matter how tight the clamping bolts and nuts are set up, so that a corrective adjustment is soon needed.

In order to overcome these objections, I have devised my present bracket. According to my invention, the adjustment for the bracket and lamp is located externally of the lamp, permitting rapid and economical assembly and convenient subsequent adjustment of the lamp to a new position when desired without requiring that the lamp be dismantled and the inside connections disturbed. Moreover, the outside adjustment is positively held, thus insuring that the lamp will remain in a desired position against the dislodging effects of excessive vibration in use.

Another feature of my invention resides in the connecting element between the lamp and clamp carrying members of the bracket, whereby these members may be easily and quickly adjusted relative to each other and positively locked in adjusted position.

These and various other features which will appear more fully hereinafter are secured in the device of the present invention.

The construction, operation and manner of assembling my bracket is fully disclosed in the specification which follows, illustrated in the accompanying drawings, and particularly pointed out in the appended claims. Throughout the specification and drawings like reference characters are correspondingly applied, and in the drawings:

Figure 1 is a top plan view of a bracket constructed in accordance with my invention and shown in applied position.

Fig. 2 is an elevation view thereof.

Fig. 3 is a similar view from the opposite side.

Fig. 4 is a partial longitudinal section particularly illustrating the connection of the lamp to the bracket.

Fig. 5 is a detail view of the outside adjusting device removed.

My bracket consists of a clamp carrying member and a lamp carrying member swiveled to each other so as to permit the lamp to be swung about a vertical or horizontal axis, according to whether the lamp is mounted upon the vertical tubing of a windshield or the horizontal handle bar of a bicycle or motor cycle, the lamp being swiveled to the lamp carrying member to permit adjustment of the lamp about an axis at right angles to said first-named axis. This construction permits the lamp universal adjustment relative to its support.

I have indicated at 1 a portion of the shell of a lamp preferably of the spotlight type. The shell 1 adjacent the connection of the lamp carrying member of my bracket is reinforced by inside and outside reinforcement pieces 2, through which and the shell extends the threaded stem portion 3 of the lamp carrying member. This member as here shown is a simple swiveling bolt having a head 7 and a swivel portion 4, to which are fastened the arms 5 of a clamp casting 6. The threaded portion 3 of the bolt extends through the shell 1 and reinforcing pieces 2 and is clamped within the lamp by a hard fiber washer 8, a plain steel washer with a D-shaped hole 9, a split lock washer 10 and a hexagonal holding nut 11 threaded on to said thread portion 3 in the order indicated, the inner end of the threaded portion 3 preferably having a portion of its threads cut away as indicated at $3^1$, to assist in preventing the clamping elements 8, 9, 10 and 11 from backing off said portion 3.

The clamping elements 8, 9, 10 and 11 are applied and adjusted in the assembly of the bracket and lamp at the factory and by my invention the re-adjustment of these inaccessibly located parts in the use of the lamp is obviated by the provision made in the present bracket for quick and positive outside adjustment should it be desired to change the position of the lamp. In accomplishing this I provide an external shell clamping element which may be adjusted to regulate the position of the lamp externally of the lamp and without requiring the taking apart of the lamp to change the internal adjustment of the clamping elements 8, 9, 10 and 11. As here shown this external adjustment is secured by means of a hexagonal or other nut 12 threaded on to the threaded portion 3 of the bolt before said portion is inserted through the alined holes of the shell 1 and reinforcing pieces 2 and adapted when set up to compress a fiber or other washer 13 between it and the outside reinforcement piece 2 of the lamp shell, whereby to exert a degree of friction upon the lamp sufficient to retain the lamp in a desired position. The nut 12 has a solid face which is adapted to bear against the washer 13 and at its opposite end is provided with a continuous internal recess 14 adapted to receive the head 7 of the bolt, thus permitting the nut and bolt head to be brought up flush. Adjustment of the part 12 may therefore be made externally of the lamp by a slight turn of the wrench applied to the hexagonal outer face of the nut and this adjustment will provide proper tension of the lamp body to maintain said body in a desired position. The adjustment of the nut itself upon the bolt is held as here shown by a set screw $14^1$ which is adjusted through a transverse bore tapped and threaded in the external face of the nut and which set screw when set up engages the threaded portion 3 of the bolt.

The clamp portion of my bracket as before stated consists of a casting 6 provided with spaced rearwardly extending arms 5. These arms terminate in circular swivel portions having holes alined with the hole through the swivel portion 4 of the swivel bolt and are connected in swivel relation thereto by a bolt 15 and a lock nut 16. The bolt 15 is preferably fastened to one of the arms 5 of the clamp in such a way as to lock the bolt against any tendency to rotate independently, as might happen if the lock nut 16 should become loosened. As here shown a locking pin 17 fastens the bolt head to one of the arms 5, thereby preventing independent turning movement of bolt and arm.

The casting 6 is formed as a curved relatively fixed clamping jaw 18 which may be ribbed externally as indicated at 19 and best shown in Figs. 2 and 5, for additional strength, and is provided with bearings 20 alined with bearings 21 formed on the arms 5 and receiving a pintle 22 upon which is mounted between each bearing 20 and 21, a curved relatively movable clamping jaw 23—23. The jaws 23 define with the fixed jaw 18 a concaved receiving recess or seat for a support 24 which may be either the windshield tubing or the handle bar of a motor cycle or bicycle according to the use of the lamp.

In order to accommodate the clamp to supports of varying diameter and cross-section the clamping jaws 18 and 23 are provided with internal bearing ribs 25 which when the clamp is applied to the support 24 find engagement on plural lines of contact against the support and through such engagement assist to positively hold the adjustment of the clamp. In addition to this, the pivoted jaws 23 are independently adjustable so that they may be tightly clamped to supports of varying contour and particularly to a tapered support. The independent adjustment of these jaws is effected as here shown by a pair of independently adjustable set screws 26 which are threaded through the casting 6 and engage the rear ends $23^1$ of the jaws 23 beyond their pivot 22.

In addition to permitting independent adjustment and consequent adaptation of the jaws 23 to supports of varying diameter and cross section, this construction prevents the formation of dents in the windshield tubing. As will be apparent, the set screws work against the rear ends $23^1$ of the jaws 23 and force the jaws into clamping engagement with the windshield tubing or other support 24, as distinguished from those constructions in which the set screws work directly against the windshield tubing, forming dents therein, and eventually working loose and permitting the parts to rattle.

Cross reference is made to applicant's Patent #1,218,766, issued March 13, 1917, in which is shown and claimed some of the subject matter shown but not claimed in the present application.

Various modifications may obviously be resorted to if within the limits of the appended claims.

What I therefore claim and desire to secure by Letters Patent is:

1. In combination with a lamp body, a bolt extending through the lamp shell upon which the lamp may be turned, an internal clamping element adjustable on said bolt, and a member adjustable on the bolt externally of the lamp body and adapted to be clamped thereagainst and having a continuously recessed rim adapted to fit over the bolt head.

2. In combination with a lamp body, a bolt extending through the lamp shell upon which the lamp may be turned, an internal clamping element adjustable on said bolt, a nut adjustable on the bolt externally of the lamp body and adapted to be clamped thereagainst and having a continuously recessed rim adapted to fit over the bolt head, and a set screw adapted to hold the adjustment of said nut.

In testimony whereof I affix my signature in presence of two witnesses.

ELLSWORTH A. HAWTHORNE.

Witnesses:
E. HORACE HAWTHORNE,
ROBERT J. BAHR.